US012350216B2

(12) United States Patent
Siddique

(10) Patent No.: US 12,350,216 B2
(45) Date of Patent: Jul. 8, 2025

(54) STRETCHING TABLE

(71) Applicant: Noman Siddique, Rochester, MI (US)

(72) Inventor: Noman Siddique, Rochester, MI (US)

( * ) Notice: Subject to any disclaimer, the term of this patent is extended or adjusted under 35 U.S.C. 154(b) by 340 days.

(21) Appl. No.: 17/833,059

(22) Filed: Jun. 6, 2022

(65) Prior Publication Data

US 2022/0387241 A1 Dec. 8, 2022

Related U.S. Application Data

(60) Provisional application No. 63/196,948, filed on Jun. 4, 2021.

(51) Int. Cl.

| | |
|---|---|
| ***A61H 1/02*** | (2006.01) |
| ***A61G 13/00*** | (2006.01) |
| *A61G 7/075* | (2006.01) |
| *A61G 13/12* | (2006.01) |

(52) U.S. Cl.

CPC ........... *A61H 1/0222* (2013.01); *A61G 7/075* (2013.01); *A61G 13/009* (2013.01); *A61G 13/1245* (2013.01); *A61H 2201/0192* (2013.01); *A61H 2201/5007* (2013.01)

(58) Field of Classification Search

CPC ...... A61H 1/02; A61H 1/0218; A61H 1/0222; A61H 1/0237; A61H 1/0244; A61H 1/0292; A61H 2001/0248; A61G 7/015; A61G 7/075; A61G 7/0755; A61G 13/0081; A61G 13/123; A61G 13/1245; A61G 13/00; A61G 13/0009; A61G 13/0018; A61G 13/0036; A61G 13/005; A61G 13/009; A61G 13/02; A61G 13/08; A61G 13/12; A61F 5/04; A61F 5/042; A47C 17/62; A47B 13/023; A47B 13/003; A47B 13/02; A47B 23/046

See application file for complete search history.

(56) References Cited

U.S. PATENT DOCUMENTS

| | | | | |
|---|---|---|---|---|
| 7,951,097 B2 * | 5/2011 | Schaeffer | A61H 1/0281 | 601/24 |
| 2004/0133979 A1 * | 7/2004 | Newkirk | A61F 5/3761 | 5/624 |
| 2010/0205742 A1 * | 8/2010 | Stone | A61G 15/02 | 5/617 |
| 2013/0111667 A1 * | 5/2013 | Stern | A61G 13/04 | 5/604 |
| 2015/0196447 A1 * | 7/2015 | Henderson | A61G 13/123 | 5/624 |
| 2016/0095773 A1 * | 4/2016 | Ruch | G16H 40/63 | 5/616 |

* cited by examiner

*Primary Examiner* — Keri J Nelson
(74) *Attorney, Agent, or Firm* — REISING ETHINGTON PC

(57) ABSTRACT

A stretching table that provides targeted stretching for lower extremity, lower back and/or lower abdominal muscle groups in a human patient and is capable of being manipulated in a number of different configurations. The stretching table is capable of providing targeted stretching so that certain muscle groups can be stretched, rehabilitated and/or worked on individually. According to one example, the stretching table includes a base member, an upright member connected to the base member, an upper body support member connected to the upright member, and first and second lower body support members connected to the upper body support member via a connection mechanism.

20 Claims, 6 Drawing Sheets

STRETCHING TABLE

RELATED APPLICATIONS

This application claims the benefit of U.S. Provisional Application No. 63/196,948, filed Jun. 4, 2021, the entire contents of which are herein incorporated by reference.

FIELD

The present invention generally relates to a stretching table and, more particularly, to a stretching table that provides targeted stretching for lower extremity, lower back and/or lower abdominal muscle groups in a human patient.

BACKGROUND

Various types of stretching tables, including different physical therapy tables, exam tables and treatment tables, are known in the art. Although such tables may enable human patients to stretch different muscles, they are typically limited in terms of the different ways in which they can target and isolate lower extremities, lower backs and/or lower abdominal muscle groups. Furthermore, providing a stretching table that is both sturdy and durable, yet is small and compact enough so that it can be used in a number of office and other settings, can be challenging.

SUMMARY

According to one aspect, there is provided a stretching table for targeted stretching of a human patient, comprising: an upper body support member; a connection mechanism connected to the upper body support member; and first and second lower body support members connected to the connection mechanism, wherein the first and second lower body support members can move, with respect to the upper body support member, via the connection mechanism.

According to various embodiments, the stretching table may further include any one of the following features or any technically-feasible combination of some or all of these features:

- further comprising: a base member; and an upright member connected to the base member, wherein the upper body support member is connected to the upright member;
- the base member is a flat metal piece that is configured to rest on the ground and act as a foundation for the stretching table;
- the base member is longer in a length direction X than in a width dimension Y, and includes a plurality of legs extending from a rear end;
- the upright member is a metal tower that is configured to elevate and support the human patient at a desired height, the upright member includes a lower end attached to the base member and an upper end attached to an underside of the upper body support member;
- the upright member is forward-leaning such that the lower end is attached to the base member and the upper end extends outwardly in a length direction X beyond an edge of the base member;
- the upper body support member is configured to support at least a portion of an upper body or torso of the human patient, the upper body support member includes an underside where an upright member and the connection mechanism are connected;

- each of the first and second lower body support members is configured to support at least a portion of a lower body or lower extremity of the human patient, each of the first and second lower body support members includes an underside where the connection mechanism is connected;
- the connection mechanism is an adjustable connection or coupling that is configured to allow the first and second lower body support members to independently rotate, swivel, tilt and/or otherwise move, with respect to the upper body support member and with respect to one another;
- the connection mechanism includes a first swivel arm connected to a first tilt arm for supporting the first lower body support member, and a second swivel arm connected to a second tilt arm for supporting the second lower body support member;
- the first swivel arm includes a swivel hole near one end, a tilt hole near another end, and a bend located between the swivel hole and the tilt hole;
- the swivel hole receives a primary attachment bolt and extends along a swivel hole axis A that is generally parallel to a height direction Z of the stretching table, the first swivel arm rotates or swivels about the swivel hole axis A so that the first lower body support member can be rotated or swiveled side-to-side independently of the second lower body support member and independently of the upper body support member;
- the tilt hole receives a first bolt and extends along a tilt hole axis B that is aligned in a plane that is generally parallel to a plane containing a length direction X and a width direction Y of the stretching table, the first tilt arm rotates or tilts about the tilt hole axis B so that the first lower body support member can be rotated or tilted up and down independently of the second lower body support member and independently of the upper body support member;
- the swivel hole receives a primary attachment bolt and extends along a swivel hole axis A, the tilt hole receives a first bolt and extends along a tilt hole axis B, and the swivel hole axis A and the tilt hole axis B are generally perpendicular to one another;
- the first and second swivel arms form a wishbone configuration where they are connected at a common location by a primary attachment bolt, and also spread out from one another such that the first and second lower body support members can be aligned side-by-side in a generally parallel manner;
- the first tilt arm includes a tilt hole near one end, a mounting section near the other end, and a bend located between the tilt hole and the mounting section, the bend is configured such that the first lower body support member can be aligned in generally the same plane as the upper body support member;
- further comprising: a drive mechanism that includes an electric motor coupled to the connection mechanism, wherein activation of the drive mechanism causes the electric motor to adjust the position of the first lower body support member, the second lower body support member, or both the first and second lower body support members;
- further comprising: a control mechanism that includes a remote control device coupled to the drive mechanism, wherein activation of the control mechanism causes the remote control device to send one or more control signals to the electric motor, which causes the electric motor to adjust the position of the first lower body support member, the second lower body support member, or both the first and second lower body support members; and the stretching table provides for at least four degrees of freedom in order to enable targeted stretching of different muscle groups in the human patient, the different muscle groups include at least one muscle group selected from the group consisting of: bilateral hamstrings, abductors, deep hip flexors, multifidus, longissimus, spinalis, quadratrus lumborum, bilateral rectus abdominis and bilateral external obliques.

According to another aspect, there is provided a method of operating a stretching table for targeted stretching of a human patient, the stretching table comprising: an upper body support member; a connection mechanism connected to the upper body support member; and first and second lower body support members connected to the connection mechanism, wherein the first and second lower body support members can move, with respect to the upper body support member, via the connection mechanism; the method comprising the steps of: rotating or swiveling at least one of the first or second lower body support members side-to-side; and rotating or tilting at least one of the first or second lower body support members up and down.

DRAWINGS

Preferred embodiments will hereinafter be described in conjunction with the appended drawings, wherein like designations denote like elements, and wherein.

DESCRIPTION

The stretching table disclosed herein provides targeted stretching for lower extremity, lower back and/or lower abdominal muscle groups in a human patient and is capable of being manipulated in any number of different configurations. In particular, the stretching table is capable of providing targeted stretching so that certain muscle groups can be stretched, rehabilitated and/or worked on individually. Some non-limiting examples of muscle groups that may be targeted by the present stretching table include: in the lower extremities, the bilateral hamstrings, the abductors, and the deep hip flexors; in the lower back, the multifidus, the longissimus, the spinalis, and the quadratrus lumborum; and in the lower abdominals, the bilateral rectus abdominis and the bilateral external obliques. Of course, the stretching table of the present application may be operated or manipulated in any number of different ways and configurations and is not limited to targeted stretching of the aforementioned muscle groups, as other muscle groups and/or combinations of muscle groups may be stretched as well.

Figure 1:
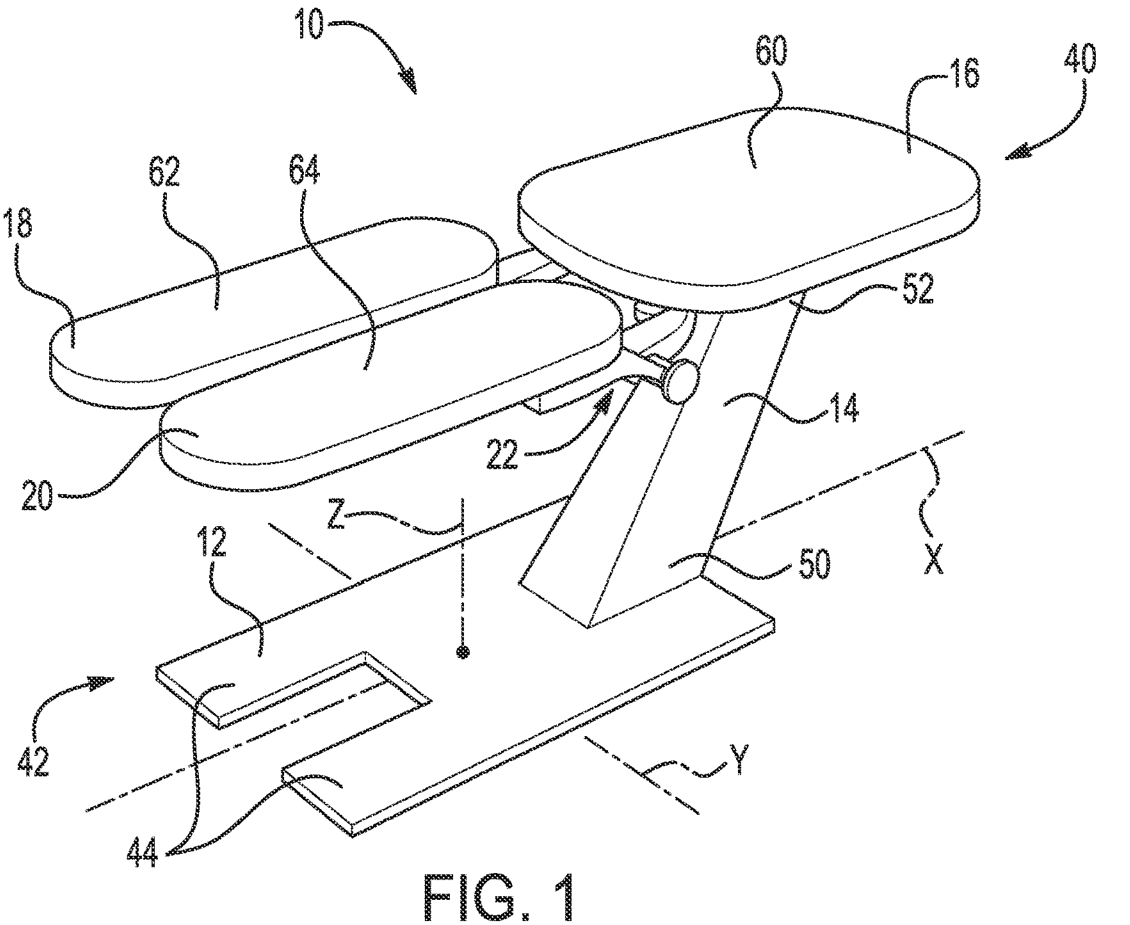
FIG. 1 is a perspective view of an example of a stretching table, where first and second lower body support members are in a neutral position.
Figure 2:
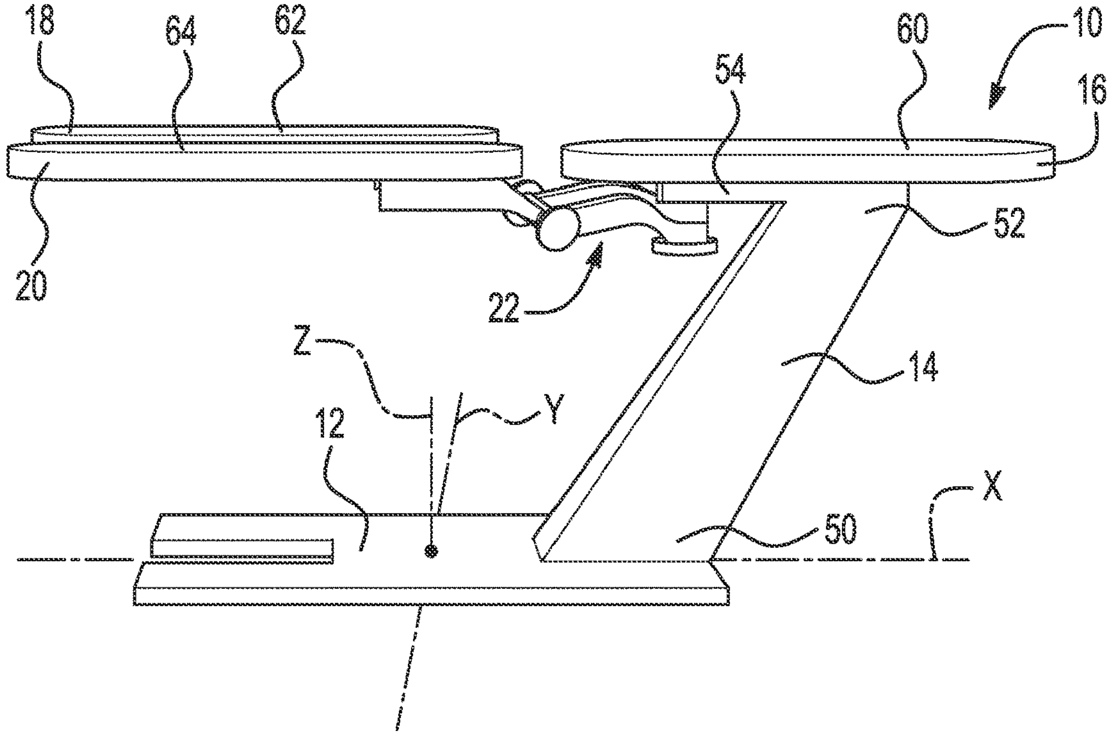
FIG. 2 is a side view of the stretching table of FIG. 1.
Figure 3:
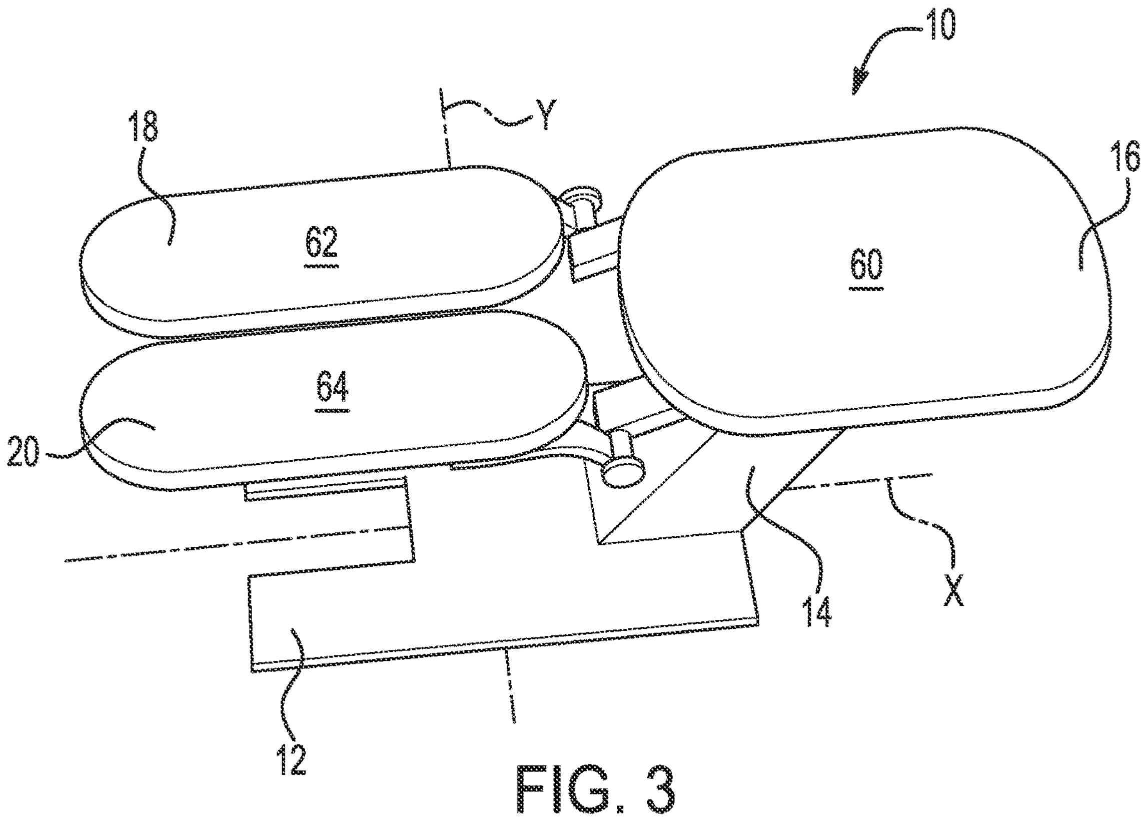
FIG. 3 is a top view of the stretching table of FIG. 1.

Turning now to FIGS. 1-3, there is shown an example of a stretching table 10 in an initial or neutral position, where the stretching table includes a base member 12, an upright member 14, an upper body support member 16, first and second lower body support members 18, 20, a connection mechanism 22, a drive mechanism 24, and a control mechanism 26.

Base member 12 provides the stretching table 10 with a sturdy base or foundation for supporting the rest of the table. According to the non-limiting example shown in the drawings, the base member 12 is a flat, horizontal metal piece (e.g., one made from steel, aluminum, etc.) that rests on the ground and has a generally rectangular shape that is longer in a length direction X than in a width direction Y. At a forward end 40 of the stretching table the upright member 14 is attached to the base member 12, and at a rear end 42 of the stretching table the base member 12 includes a plurality of legs 44. It should be appreciated that the base member 12 is not limited to the exemplary embodiment shown in the drawings and may instead have any number of different configurations, including ones that are: rectangular shaped (with legs at the forward end, legs at the rear end, legs at both the forward and rear ends, legs at neither end, etc.), square shaped, oval shaped, circular shaped, or irregularly shaped, to cite a few examples. In addition, the base member 12 may include through holes along its perimeter so that the base member 12 and, thus, the entire stretching table 10, can be securely bolted or otherwise fastened to the floor.

Upright member 14 supports the upper and lower body support members so that the patient can be elevated and supported at a desirable height. In one example, the upright member 14 is a tapered and forward-leaning metal tower or column and includes a lower end 50 and an upper end 52. The tapered configuration causes the upright member 14 to be slightly larger in cross-section at the lower end 50, where the member is welded, bolted and/or otherwise attached to the base member 12, than towards the upper end 52, where it is welded, bolted and/or otherwise attached to an underside of the upper body support member 16. The cross-sectional shape of the upright member 14 may be rectangular so that its longer in a length direction X than it is in a width direction Y; such a cross-sectional configuration may be advantageous in terms of strengthening the upright member 14 and helping to support the weight of the patient, since much of that weight is cantilevered out on the lower body support members 18, 20 that extend in the length direction X. The forward-leaning configuration of the upright member 14 is also useful in terms of supporting the weight of the patient. In the illustrated example, the upright member 14 is forward-leaning such that its upper end 52 extends outwardly in the length direction X, beyond an edge of the forward end 40 of the base member 12 (this is best seen in FIG. 2). Towards the upper end 52 of the upright member 14 there is a mounting section 54 that extends in the length direction X towards the rear end 42, and that is connected to and supports an underside of the upper body support member 16. The mounting section 54 may simply have a small rectangular surface on which the upper body support member 16 is supported, or it could have a larger pedestal type design with greater surface area for better distributing the weight of the patient. It should be appreciated that the upright member 14 does not need to be a solid, stationary member, but rather it could be telescoping and/or otherwise arranged so that its height can be adjusted up or down (the adjustment feature could be manual, motorized, pneumatic, hydraulic, etc.).

Upper body support member 16 is designed to support an upper body or torso of a human patient, or at least portions thereof. According to the illustrated example, the upper body support member 16 is a flat, horizontal cushioned surface that is sized and shaped to comfortably support portions of a patient's upper body (e.g., the upper body support member 16 may support a patient's upper body from the head to around the umbilicus). The upper body support member 16 may be oval or rectangular in shape, as shown in the drawings, or it can have a different shape and/or size. The upper body support member 16 may include a support frame (not shown), such as a metal or plastic framework extending around the perimeter and/or across the interior of the support member, a flat support piece (not shown) in the form of a board or the like that is mounted to the support frame, as well as a cushioned outer layer 60 (e.g., one made from a foamed material) that is wrapped and pulled tight around the support frame and/or flat support piece so that the patient has a soft surface to lay on. It is possible for the cushioned outer layer 60 to be substantially flat or planar on its upper surface, as illustrated in the drawings, or it can be provided with the contours of a human patient's upper body portions, such as grooves and mounds designed to comfortably compliment the typical curves of a body. In one example, the upper body support member 16 is rigidly and stationarily attached to the elevated member 14; in another example, the upper body support member 16 may rotate or pivot with respect to the elevated member 14.

First and second lower body support members 18, 20 are designed to support a lower body or lower extremities of a human patient. In one example, the lower body support members 18, 20 are flat, elongated cushioned surfaces that are sized and shaped to comfortably support portions of a patient's lower body, such as the legs. The first and second lower body support members 18, 20 are adjustably connected to the upper body support member 16 via the connection mechanism 22 and can be independently adjusted or manipulated, as will be explained in greater detail. Similar to the upper body support member 16 described in the previous paragraph, each of the first and second lower body support members 18, 20 may include a support frame (not shown), such as a metal or plastic framework extending around the perimeter and/or across the interior of the support member, a flat support piece (not shown) in the form of a board or the like that is mounted to the support frame, as well as a cushioned outer layer 62, 64 (e.g., one made from a foamed material) that is wrapped and pulled tight around the support frame and/or the flat support piece to provide a soft surface. It is possible for the cushioned outer layer 62, 64 to be substantially flat or planar on its upper surface, as illustrated in the drawings, or it can be provided with the contours of a human patient's lower body, such as grooves or channels designed to comfortably receive the curves of a leg. When aligned in the length direction X (as shown in FIGS. 1-3), the first and second lower body support members 18, 20 may extend slightly beyond the rear end 42 of the base member 12. Although the exact size and shape of the various components of the stretching table 10 may vary from those shown and described herein, it is preferable that they be arranged so as to provide some balance in terms of supporting the weight of the patient and also to provide convenient access to a practioner who is working on the patient. Also, it is possible for the upper body support member 16 and/or the lower body support members 18, 20 to have extendable supports that can slide or pull out from the main support members in order to better accommodate taller patients with longer upper and/or lower bodies.

Figure 8:
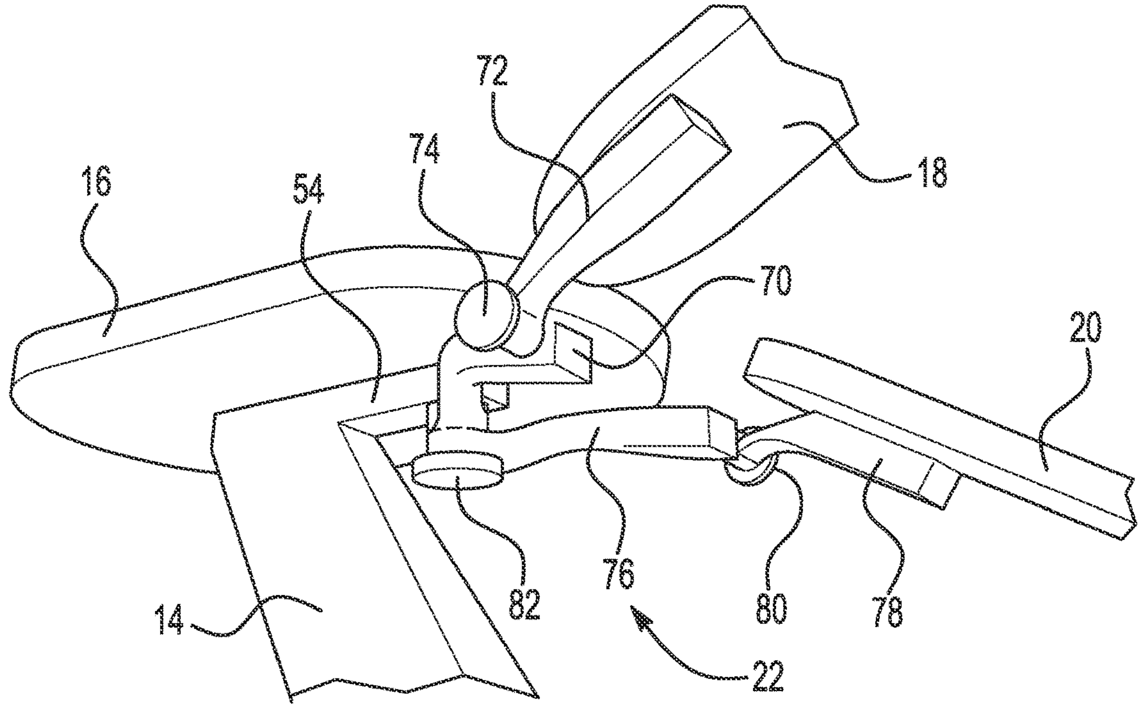
FIG. 8 is an enlarged view of a portion of the stretching table of FIG. 1 and illustrates an example of a connection mechanism.
Figure 9:
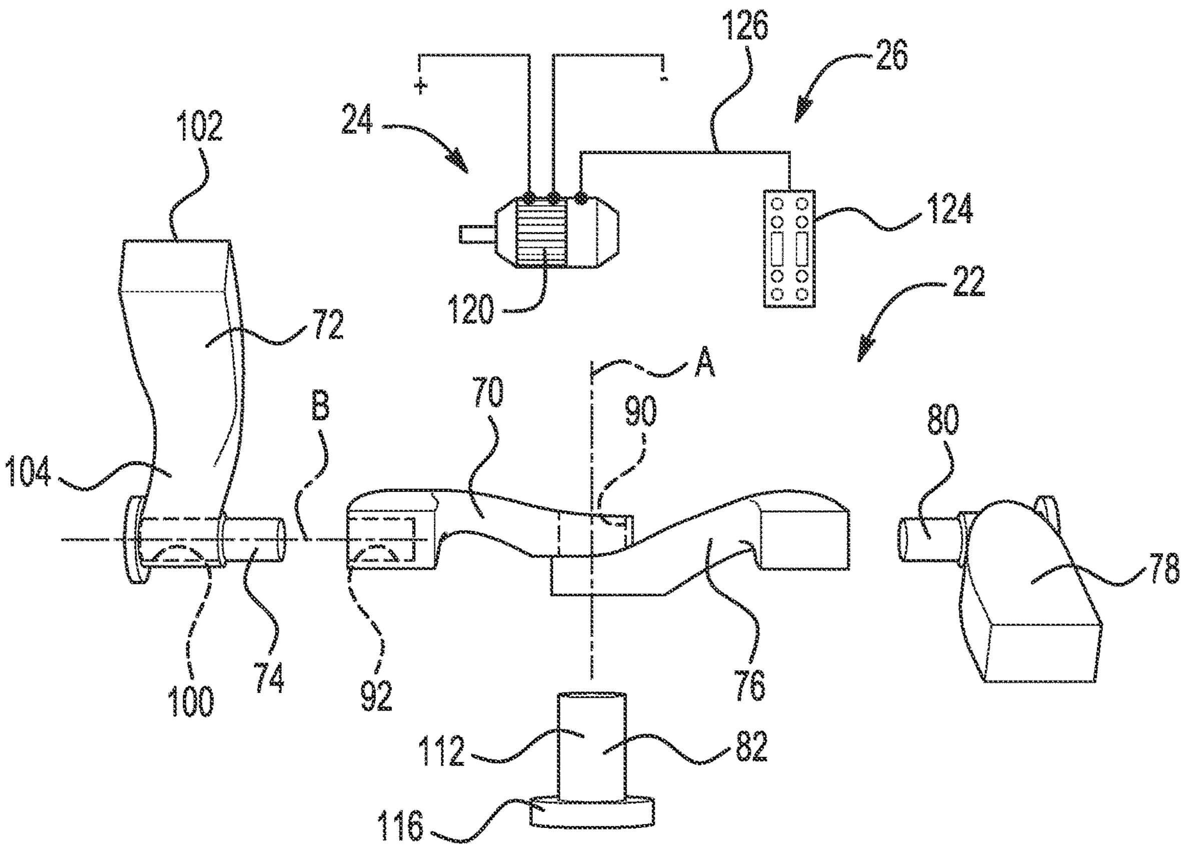
FIG. 9 is an exploded view of the connection mechanism of FIG. 8.

Connection mechanism 22, which is best illustrated in FIGS. 8 and 9, is an adjustable connection or coupling that allows the first and/or second lower body support members 18, 20 to rotate, swivel, tilt and/or otherwise move in any number of different manners, with respect to the upper body support member 16. The first and second lower body support members 18, 20 may move independently of one another or they may move in unison or conjunction with one another. According to one example, the connection mechanism 22 includes a first swivel arm 70, a first tilt arm 72, a first bolt 74, a second swivel arm 76, a second tilt arm 78, a second bolt 80, and a primary attachment bolt 82.

Figure 10:
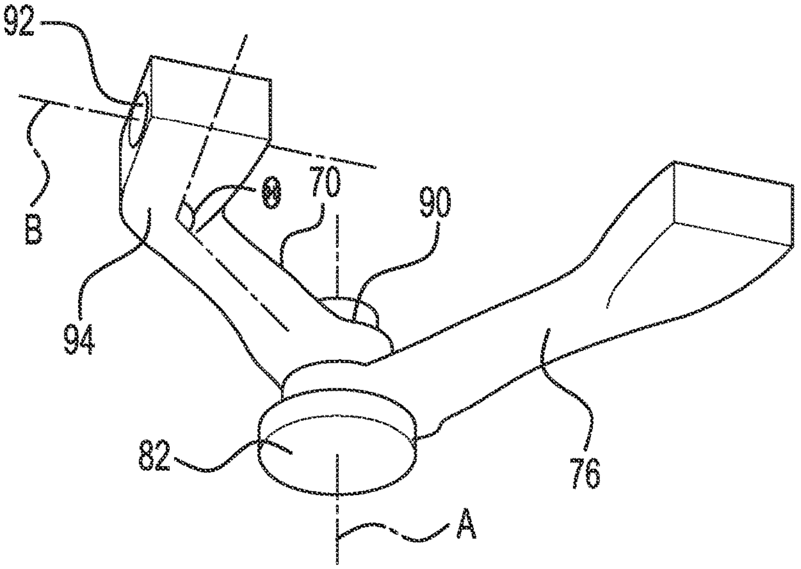
FIGS. 10-13 are perspective views of various components of the connection mechanism of FIG. 8.
Figure 11:
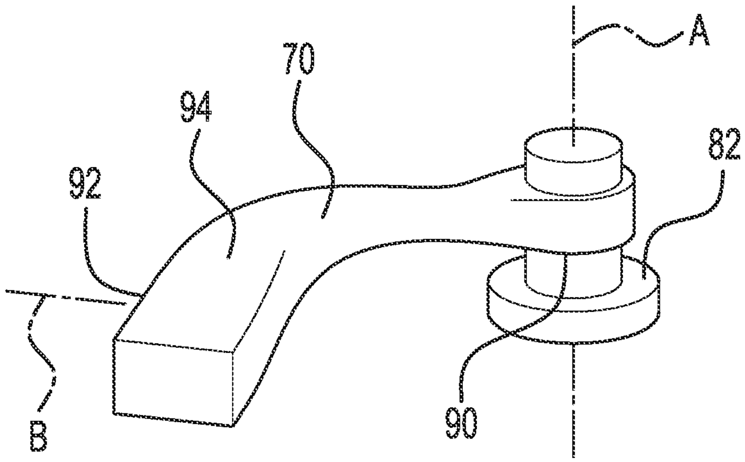

The first swivel arm 70, the first tilt arm 72 and the first bolt 74 all work together to adjustably support the first lower body support member 18 so that it can swivel side to side, tilt up and down and/or otherwise move in some other manner. Starting with the first swivel arm 70, it is preferably a solid metal piece (e.g., one made from steel, aluminum, etc.) that is in the shape of a half wishbone and includes a swivel hole 90 near one end, a tilt hole 92 near the other end, and a bend or turn 94 towards the middle of the arm in between holes 90 and 92. The swivel hole 90 is preferably a through hole that extends all the way through the first swivel arm 70 along a swivel hole axis A and is sized to rotatably accommodate the primary attachment bolt 82, whereas the tilt hole 92 extends at least partially through the first swivel arm 70 (it could extend all the way through, but it does not have to) along a tilt hole axis B and is sized to rotatably accommodate the first bolt 74. In one example, the swivel hole axis A is aligned so that it is generally parallel to a height direction Z of the stretching table 10, and the tilt hole axis B is aligned in a plane that is generally parallel to a plane containing the length direction X and the width direction Y. The swivel hole axis A and the tilt hole axis B may be perpendicular to one another. The bend or turn 94 is configured so that the other end of the first swivel arm 70, which includes the tilt hole 92, is bent inwards towards the second swivel arm 76, as opposed to being bent outwards away from the second swivel arm. This inward bend 94 enables the first and second swivel arms 70, 76 to be attached at a common location (i.e., the primary attachment bolt 82), but also be able to spread out from one another so that the first and second lower body support members 18, 20 can be aligned side-by-side in a generally parallel manner (see, for example, neutral position in FIGS. 1-3). According to a non-limiting example, the bend 94 is arranged at an angle θ between 45° and 90°, inclusive (see FIG. 10). It is also possible for bend 94 to be a compound bend, so that it is not only bent according to the angle θ, but also has an upward bend.

Figure 12:
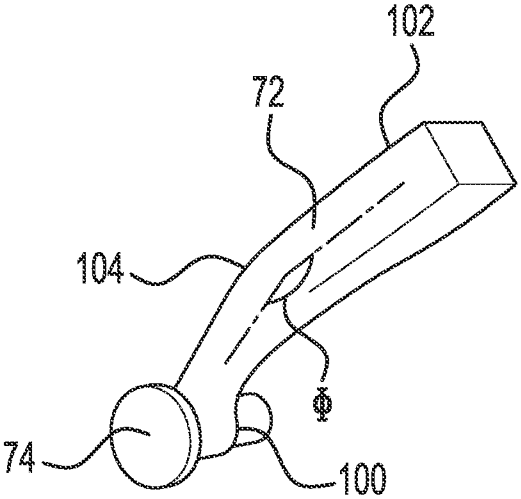
Figure 13:
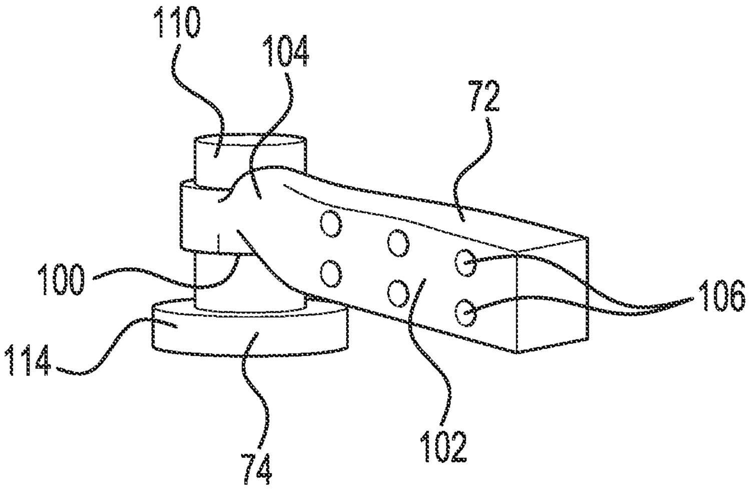

First tilt arm 72 is also preferably a solid metal piece (e.g., one made from steel, aluminum, etc.) and includes a tilt hole 100 near one end, a mounting section 102 near the other end, and a bend or turn 104 that is located towards the one end but is in between hole 100 and mounting section 102. The tilt hole 100 extends through the first tilt arm 72 along the tilt hole axis B and is sized to rotatably accommodate the first bolt 74. As illustrated in FIG. 9, the axes of tilt holes 92 and 100 are preferably aligned with one another so that the two tilt holes can receive the first bolt 74 and tiltably hinge or rotate about the first bolt. The mounting section 102 is a flat surface on the top of the first tilt arm 72 and is designed to attach to and support an underside of the first lower body support member 18. Depending on the attachment mechanism that is used to fasten or secure the lower body support member 18 to the first tilt arm 72, the mounting section 102 may include a number of optional threaded or non-threaded attachment holes 106, attachment brackets (not shown), or some other form of attachment mechanism. The bend or turn 104 is configured so that the other end of the first tilt arm 72, which includes the mounting section 102, is bent slightly upwards, as opposed to being straight or bent downwards. This enables the first lower body support member 18 to be aligned in generally the same plane as the upper body support member 14 when the stretching table 10 is in a neutral position (see FIG. 2, for example). According to a non-limiting example, the bend 104 is arranged at an angle $\phi$ between 5° and 45°, inclusive (see FIG. 12).

First bolt 74 and primary attachment bolt 82 are preferably solid metal bolts or pins (e.g., ones made from steel, aluminum, titanium, etc.) that extend through corresponding holes in various pieces of the connection mechanism 22 and enable those pieces to swivel, tilt, rotate, hinge, etc. According to the example shown in the drawings, bolts 74 and 82 have a stem portion 110, 112 and a head portion 114, 116, respectively. The size, shape, configuration, etc. of the bolts 74, 82 may differ from those shown and may be altered to meet the specific geometry of the hole and/or part into which they fit. It is even possible to use a cotter pin or the like so that bolts 74 and 82 are maintained in their respective holes and do not inadvertently back out.

In a manner similar to that just described, the second swivel arm 76, the second tilt arm 78 and the second bolt 80 all work together to adjustably support the second lower body support member 20 so that it can swivel side to side, tilt up and down and/or otherwise move in some other manner. The second swivel arm 76, second tilt arm 78, and second bolt 80 may include a similar set of holes, hole axes, bends or turns, mounting sections, ends, angles, stem portions, head portions, etc. as those described in the preceding paragraphs. For purposes of conciseness, a second duplicate description has been omitted, however, the description above applies equally to the second swivel arm 76, the second tilt arm 78 and the second bolt 80. As shown in FIG. 9, the first and second swivel arms 70, 76 are stacked on top of each other such that their respective swivel holes line up with the primary attachment bolt 82. The first swivel arm 70 is shown being stacked on top of the second swivel arm 76, but this is not necessary as the order could be reversed. Whichever swivel arm is on the lower end or bottom of the stack, the lower swivel arm and/or the lower tilt arm (i.e., the tilt arm connected to the lower swivel arm) should have a greater or more severe upward bend so that the corresponding attachment surface will maintain the corresponding lower body support member at an equal height as the other lower body support member. This allows the first and second lower body support members 18, 20 to be maintained at roughly the same height when in a neutral position, such as shown in FIG. 2.

Drive mechanism 24 enables a user, whether the user is the patient or a practioner, to adjust the position and/or orientation of the first and/or second lower body support members 18, 20 so that targeted stretching for lower extremity, lower back and/or lower abdominal muscle groups can be achieved. The drive mechanism 24 may be manual, electric, pneumatic and/or hydraulic in nature, depending on the needs of the particular application. According to one possibility, the drive mechanism 24 is an electric drive mechanism and includes one or more electric motor(s) 120, such as servo motors, that are operatively coupled to the first and second swivel arms 70, 76, as well as the first and second tilt arms 72, 78. The drive mechanism 24 may include a separate electric motor at each of the pivoting joints (i.e., separate motors at the connection of the first and second swivel arms 70, 76 via primary attachment bolt 82, at the connection of the first swivel and tilt arms 70, 72, and at the connection of the second swivel and tilt arms 76, 78); it is also possible for the drive mechanism to include only a single electric motor with various output linkages so as to be able to control the different pivoting joints. Other motor and/or output arrangements are certainly possible.

Control mechanism 26 allows the user to adjust, manipulate and/or otherwise precisely control the drive mechanism 24, and hence the position of the overall stretching table 10, in any number of different ways. The control mechanism 26 may include a remote control device 124. In one embodiment, the remote control device 124 is a standard hand held controller that is connected to the drive mechanism 24 via a wired connection 126 or is wirelessly connected, such as via Bluetooth or some other short-range wireless protocol. In a different embodiment, the remote control device 124 is provided in software as an "app" or similar software package that can be installed on a user's mobile phone, tablet, laptop and/or other device. In yet another embodiment, the remote control device 124 is provided as part of a larger computer terminal or system that can be connected to one or more stretching tables 10, such as in a hospital or clinic-type setting, and operates them accordingly.

It should be appreciated that the present stretching table is not limited to the various examples and embodiments provided herein. Numerous alternatives are possible and are intended to be part of the present disclosure.

In operation, a user is able to adjust or manipulate the stretching table 10 to provide targeted stretching for lower extremity, lower back and/or lower abdominal muscle groups. It is possible for the user to be the patient such that no other person is needed to cycle through the targeted stretching routine (e.g., if the stretching table 10 is installed in the patient's home); it is possible for the user to be a practioner who is with the patient and is interacting with the patient as they progress through the targeted stretching routine (e.g., if the stretching table 19 is installed at the practioner's clinic or facility); or it is possible for the user to be a practioner that is located remotely from the patient and is controlling the stretching table 10 remotely via the control mechanism 26, to cite a few possibilities.

Figure 4:
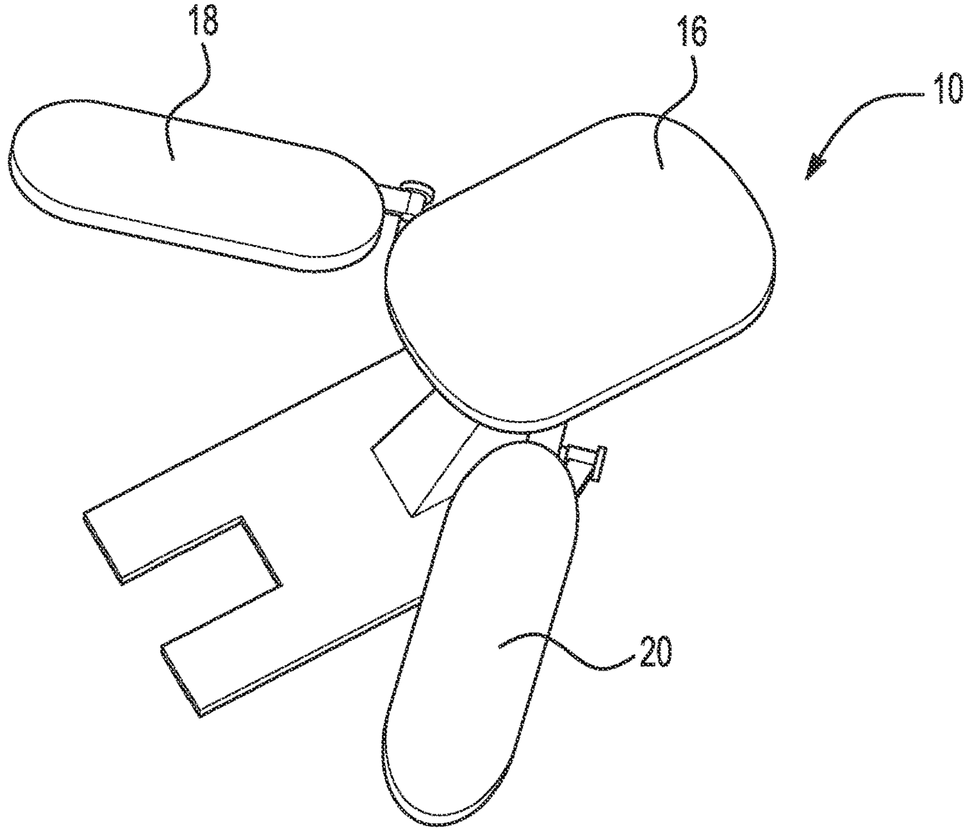
FIG. 4 is another top view of the stretching table of FIG. 1, except the first and second lower body support members are in an outstretched position.

Turning to FIG. 4, there is shown an example where a user had engaged the stretching table 10 so that the first and second lower body support members 18, 20 have been driven from the neutral position in FIG. 3 to the outstretched positions in FIG. 4. In this particular example, both lower body support members 18, 20 have been outwardly swiveled or rotated from a neutral position to an outstretched position, but it is certainly possible for only one of the lower body support members to be outwardly swiveled. More specifically, a user has engaged the control mechanism 26 and pressed buttons indicating that they wish to have both lower body support members 18, 20 swiveled outwardly; the control mechanism 26 then sends one or more control signals to the drive mechanism 24, which interprets and/or applies the corresponding commands so that electric motor 120 is driven accordingly; this, in turn, causes the first and second swivel arms 70, 76 to swivel or rotate outwardly about the swivel hole axis A, thereby causing the first and second lower body support members 18, 20 to spread out and provide abduction, flexion, extension and/or stretching of a particular muscle group in the patient. The amount or degree of stretch can be controlled by the user via the control mechanism 26.

Figure 5:
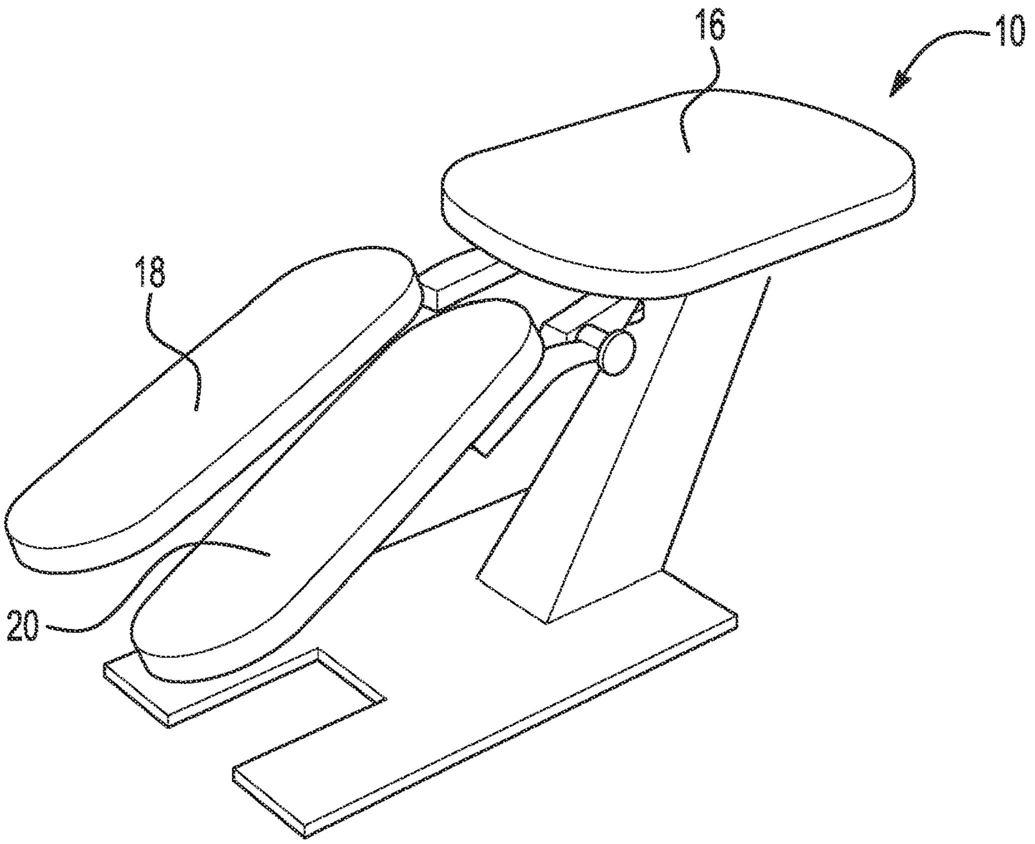
FIG. 5 is another perspective view of the stretching table of FIG. 1, except the first and second lower body support members are in a declining position.
Figure 6:
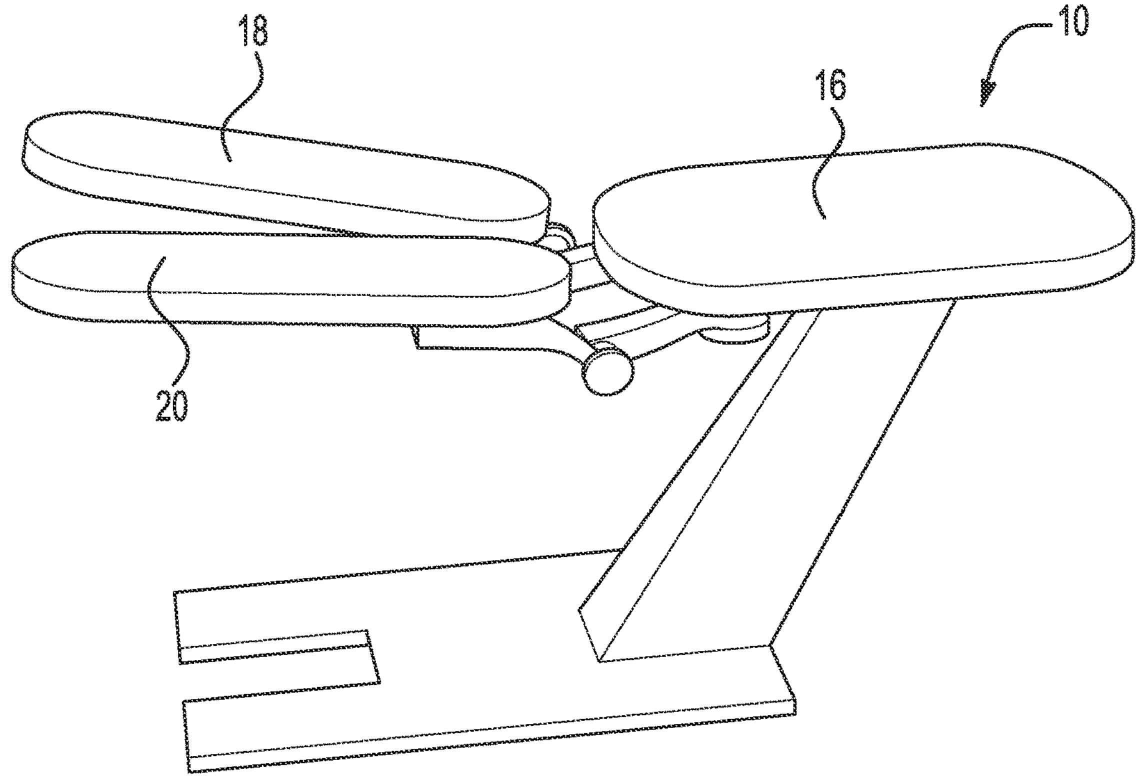
FIG. 6 is another perspective view of the stretching table of FIG. 1, except the first and second lower body support members are in an inclining position.
Figure 7:
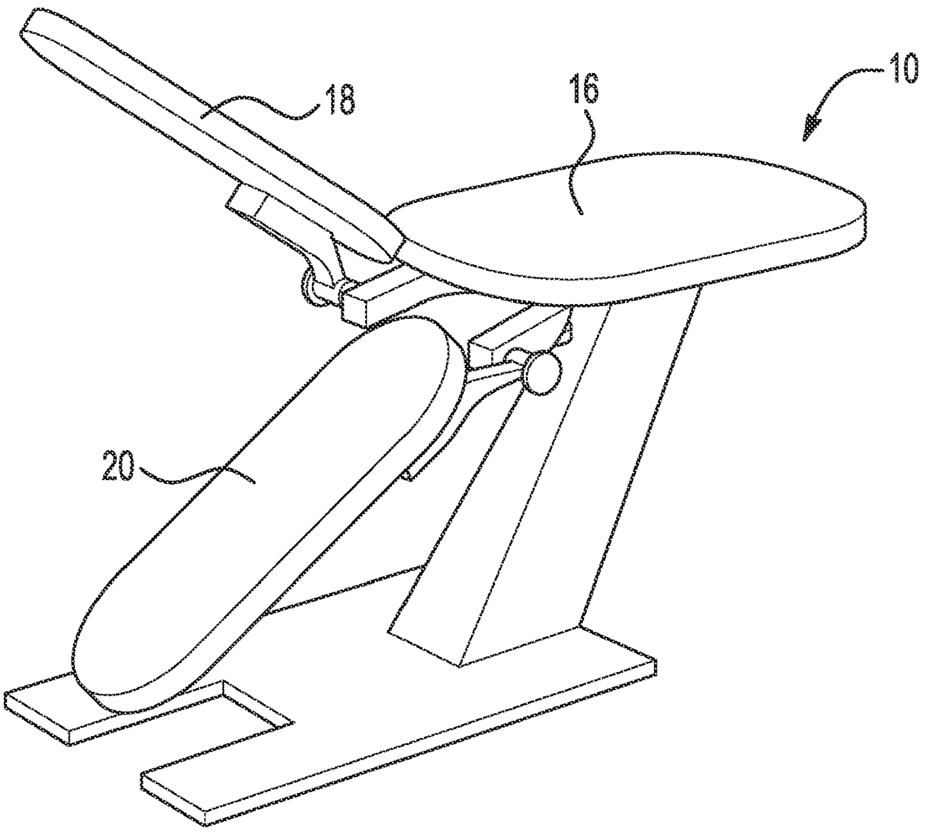
FIG. 7 is another perspective view of the stretching table of FIG. 1, except the first lower body support member is in an inclining position and the second lower body support member is in a declining position.

Referring now to FIGS. 5-7, there are shown examples of where a user has engaged the stretching table 10 so that the first and second lower body support members 18, 20 have been driven from the neutral position in FIG. 3 to various tilted positions. In FIG. 5, both lower body support members 18, 20 have both been downwardly tilted or inclined from a neutral position to a declining position. If the patient is supine (i.e., laying on their back), then the configuration in FIG. 5 could provide targeted stretching by way of lumbar extension; if the patient is prone (i.e., laying on their stomach), then the configuration in FIG. 5 could provide targeted stretching by way of lumbar flexion. In FIG. 6, both lower body support members 18, 20 have been slightly upwardly tilted or inclined to an inclining position. In this case, if the patient is either supine or prone, then the configuration in FIG. 6 could provide targeted stretching by way of abduction. In FIG. 7, the first lower body support member 18 has been upwardly tilted while the second lower body support member 20 has been downwardly titled so that the two support members have a scissor-like arrangement. If the patient is supine, then the configuration in FIG. 7 could provide targeted stretching by way stretching the right hamstring and the left deep flexor; if the patient is prone, then the configuration in FIG. 7 could provide targeted stretching by stretching the hip flexors.

For each of the various configurations, a user may engage the control mechanism 26 and make selections indicating that they wish to have one or both lower body support members 18, 20 tilted upwardly or downwardly. The control mechanism 26 then sends one or more control signals to the drive mechanism 24, which interprets and/or applies the corresponding commands so that electric motor 120 is driven accordingly. This, in turn, causes the first and second tilt arms 72, 78 to tilt (either up or down) about the tilt hole axis B, thereby causing the first and/or second lower body support members 18, 20 to incline or decline and stretch the patient. Similarly, the patient may engage the control mechanism 26 to swivel or rotate the first and/or second lower body support members 18, 20 in an inwardly or outwardly direction. This causes the control mechanism 26 to send one or more control signals to the drive mechanism 24, which interprets and/or applies the corresponding commands so that electric motor 120 drives the first and second swivel arms 70, 76 to swivel or rotate (either inwardly or outwardly) about the swivel hole axis A. Of course, any number of other manipulations and/or adjustments may be made to the stretching table 10, as it is certainly not limited to the positions shown in the drawings.

It is preferable that the upper body support member 16 stay stationary as the lower body support members 18, 20 are being adjusted. This provides a sturdy base or arrangement for the stretching table 10, while at the same time limiting the moving parts to just the lower body support members 18, 20 and the drive mechanism 24. If the swiveling motion of an individual lower body support member about the swivel hole axis A is considered one degree of freedom, and the tilting motion of an individual lower body support member about a tilting hole axis B is considered one degree of freedom, then the stretching table 10 provides for at least four degrees of freedom (two degrees of freedom per lower body support member).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more members or other items, are each to be construed as open-ended, meaning that that the listing is not to be considered as excluding other, additional members or items. Other terms are to be construed using their broadest reasonable meaning unless they are used in a context that requires a different interpretation.

The invention claimed is:

1. A stretching table for targeted stretching of a human patient, comprising:

an upright member;

an upper body support member supported by the upright member;

a connection mechanism supported by the upright member, the connection mechanism includes first and second swivel arms rotatably attached at a common location to rotate or swivel about a common axis;

first and second lower body support members supported by the connection mechanism, the first lower body support member is supported by the first swivel arm, the second lower body support member is supported by the second swivel arm; and a drive mechanism, wherein the stretching table is configured so that activation of the drive mechanism causes at least one of the first or second lower body support members to move, with respect to the upper body support member, via the connection mechanism, so that targeted stretching can be provided while the human patient is on the stretching table.

2. The stretching table of claim 1, further comprising:

a base member, wherein the upright member is connected to the base member, and the upper body support member is connected to the upright member.

3. The stretching table of claim 2, wherein the base member is a flat metal piece that is configured to rest on the ground and act as a foundation for the stretching table.

4. The stretching table of claim 3, wherein the base member is longer in a length direction X than in a width dimension Y, and includes a plurality of legs extending from a rear end.

5. The stretching table of claim 2, wherein the upright member is a metal tower that is configured to elevate and support the human patient at a desired height, the upright member includes a lower end attached to the base member and an upper end attached to an underside of the upper body support member.

6. The stretching table of claim 5, wherein the upright member is forward-leaning such that the lower end is attached to the base member and the upper end extends outwardly in a length direction X beyond an edge of the base member.

7. The stretching table of claim 1, wherein the upper body support member is configured to support at least a portion of an upper body or torso of the human patient, the upper body support member includes an underside where the upright member is connected.

8. The stretching table of claim 1, wherein each of the first and second lower body support members is configured to support at least a portion of a lower body or lower extremity of the human patient, each of the first and second lower body support members includes an underside where the connection mechanism is connected.

9. The stretching table of claim 1, wherein the connection mechanism is an adjustable connection or coupling that is configured to allow the first and second lower body support members to independently rotate, swivel, tilt and/or otherwise move, with respect to the upper body support member and with respect to one another.

10. The stretching table of claim 1, wherein the connection mechanism further includes a first tilt arm rotatably attached to the first swivel arm for supporting the first lower body support member, and a second tilt arm rotatably attached to the second swivel arm for supporting the second lower body support member.

11. The stretching table of claim 10, wherein the first swivel arm includes a swivel hole near one end, a tilt hole near another end, and a bend located between the swivel hole and the tilt hole.

12. The stretching table of claim 11, wherein the swivel hole receives a primary attachment bolt and extends along a swivel hole axis A that is generally parallel to a height direction Z of the stretching table, the first swivel arm rotates or swivels about the swivel hole axis A so that the first lower body support member can be rotated or swiveled side-to-side independently of the second lower body support member and independently of the upper body support member.

13. The stretching table of claim 11, wherein the tilt hole receives a first bolt and extends along a tilt hole axis B that is aligned in a plane that is generally parallel to a plane containing a length direction X and a width direction Y of the stretching table, the first tilt arm rotates or tilts about the tilt hole axis B so that the first lower body support member can be rotated or tilted up and down independently of the second lower body support member and independently of the upper body support member.

14. The stretching table of claim 11, wherein the swivel hole receives a primary attachment bolt and extends along a swivel hole axis A, the tilt hole receives a first bolt and extends along a tilt hole axis B, and the swivel hole axis A and the tilt hole axis B are generally perpendicular to one another.

15. The stretching table of claim 10, wherein the first tilt arm includes a tilt hole near one end, a mounting section near the other end, and a bend located between the tilt hole and the mounting section, the bend is configured such that the first lower body support member can be aligned in generally the same plane as the upper body support member.

16. The stretching table of claim 1, wherein the drive mechanism includes an electric motor coupled to the connection mechanism, activation of the drive mechanism causes the electric motor to adjust the position of the first lower body support member, the second lower body support member, or both the first and second lower body support members.

17. The stretching table of claim 16, further comprising:
a control mechanism that includes a remote control device coupled to the drive mechanism, wherein activation of the control mechanism causes the remote control device to send one or more control signals to the electric motor, which causes the electric motor to adjust the position of the first lower body support member, the second lower body support member, or both the first and second lower body support members.

18. The stretching table of claim 1, wherein the stretching table provides for at least four degrees of freedom in order to enable targeted stretching of different muscle groups in the human patient, the different muscle groups include at least one muscle group selected from the group consisting of: bilateral hamstrings, abductors, deep hip flexors, multifidus, longissimus, spinalis, quadratrus lumborum, bilateral rectus abdominis and bilateral external obliques.

19. A stretching table for targeted stretching of a human patient, comprising:
an upright member;
an upper body support member supported by the upright member;
a connection mechanism supported by the upright member; and
first and second lower body support members supported by the connection mechanism, the first and second lower body support members can move, with respect to the upper body support member, via the connection mechanism;
wherein the connection mechanism includes a first swivel arm connected to a first tilt arm for supporting the first lower body support member and a second swivel arm connected to a second tilt arm for supporting the second lower body support member, the first and second swivel arms form a wishbone configuration where they are connected at a common location by a primary attachment bolt, and also spread out from one another such that the first and second lower body support members can be aligned side-by-side in a generally parallel manner.

20. A method of operating a stretching table for targeted stretching of a human patient,
the stretching table comprising:
an upright member;
an upper body support member supported by the upright member;
a connection mechanism supported by the upright member, the connection mechanism includes first and second swivel arms rotatably attached at a common location to rotate or swivel about a common axis;
first and second lower body support members supported by the connection mechanism, the first lower body support member is supported by the first swivel arm, the second lower body support member is supported by the second swivel arm, wherein the first and second lower body support members can move, with respect to the upper body support member, via the connection mechanism; and
a drive mechanism;
the method comprising the steps of:
activating the drive mechanism;
rotating or swiveling at least one of the first or second swivel arms about the common axis in response to activation of the drive mechanism so that the supported first or second lower body support members rotates or swivels side-to-side; and rotating or tilting at least one of the first or second lower body support members up and down in response to activation of the drive mechanism, whereby the method provides targeted stretching of the human patient while the human patient is on the stretching table.

* * * * *